US012115929B2

(12) United States Patent
Kim et al.

(10) Patent No.: US 12,115,929 B2
(45) Date of Patent: Oct. 15, 2024

(54) AIRBAG APPARATUS FOR VEHICLE

(71) Applicant: HYUNDAI MOBIS CO., LTD., Seoul (KR)

(72) Inventors: Dong Young Kim, Hwaseong-si (KR); Seok Min Lee, Seoul (KR); Ga Ram Jeong, Yongin-si (KR); Dong Joon Lee, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 18/348,491

(22) Filed: Jul. 7, 2023

(65) Prior Publication Data

US 2024/0181985 A1   Jun. 6, 2024

(30) Foreign Application Priority Data

Dec. 6, 2022   (KR) .......................... 10-2022-0169055

(51) Int. Cl.
| | |
|---|---|
| *B60R 21/2338* | (2011.01) |
| *B60R 21/0136* | (2006.01) |
| *B60R 21/015* | (2006.01) |
| *B60R 21/233* | (2006.01) |
| *B60R 21/237* | (2006.01) |
| *B60R 21/239* | (2006.01) |
| *B60R 21/264* | (2006.01) |
| *B60R 21/00* | (2006.01) |

(52) U.S. Cl.
CPC ...... *B60R 21/2338* (2013.01); *B60R 21/0136* (2013.01); *B60R 21/01554* (2014.10); *B60R 21/233* (2013.01); *B60R 21/237* (2013.01); *B60R 21/239* (2013.01); *B60R 21/264* (2013.01); *B60R 2021/0048* (2013.01); *B60R 2021/23308* (2013.01); *B60R 2021/23382* (2013.01); *B60R 2021/23388* (2013.01)

(58) Field of Classification Search
CPC ............ B60R 2021/23384; B60R 2021/23388
See application file for complete search history.

(56) References Cited

U.S. PATENT DOCUMENTS

| | | | | |
|---|---|---|---|---|
| 9,650,011 | B1 * | 5/2017 | Belwafa | ................ B60R 21/233 |
| 9,789,842 | B2 * | 10/2017 | Shin | ..................... B60R 21/231 |
| 10,391,968 | B2 * | 8/2019 | Jaradi | ................... B60R 21/231 |
| 10,427,638 | B2 * | 10/2019 | Choi | ..................... B60R 21/205 |
| 10,814,823 | B2 * | 10/2020 | Jaradi | ................... B60R 21/207 |

(Continued)

FOREIGN PATENT DOCUMENTS

| | | | | |
|---|---|---|---|---|
| CN | 112810564 | A * | 5/2021 | ....... B60R 21/01554 |
| DE | 102018106288 | A1 * | 9/2019 | ........... B60R 21/203 |

(Continued)

*Primary Examiner* — Nicole T Verley
(74) *Attorney, Agent, or Firm* — NovoTechIP International PLLC

(57) ABSTRACT

The present disclosure relates to a vehicle airbag device, which includes a main cushion and an auxiliary cushion deploying from the main cushion and may more effectively protect both a passenger-seat passenger in a normal seating state and a passenger-seat passenger in a relaxed seating state even in the event of an oblique offset collision by differentiating the deployment of the auxiliary cushion by releasing or maintaining the connection of a tether connected to the auxiliary cushion during deployment of an airbag cushion.

8 Claims, 6 Drawing Sheets

(56) References Cited

U.S. PATENT DOCUMENTS

| | | | | |
|---|---|---|---|---|
| 10,821,932 | B2* | 11/2020 | Kanegae | B60R 21/233 |
| 10,953,837 | B2* | 3/2021 | Arima | B60R 21/233 |
| 11,027,688 | B2* | 6/2021 | Price | B60R 21/231 |
| 11,479,204 | B1* | 10/2022 | Moran | B60R 21/216 |
| 2003/0094794 | A1* | 5/2003 | Amamori | B60R 21/233 |
| | | | | 280/729 |
| 2012/0153603 | A1* | 6/2012 | Mallinger | B60R 21/239 |
| | | | | 280/739 |
| 2012/0280477 | A1* | 11/2012 | Young | B60R 21/239 |
| | | | | 280/739 |
| 2016/0001733 | A1* | 1/2016 | Kim | B60R 21/239 |
| | | | | 280/729 |
| 2019/0193670 | A1* | 6/2019 | Morawski | B60R 21/2338 |
| 2020/0094770 | A1* | 3/2020 | Fischer | B60R 21/231 |
| 2021/0001797 | A1* | 1/2021 | Osterfeld | B60R 21/216 |
| 2021/0024028 | A1* | 1/2021 | Kanegae | B60R 21/2338 |
| 2021/0107427 | A1* | 4/2021 | Freisler | B60R 21/235 |
| 2021/0146875 | A1* | 5/2021 | Park | B60R 21/01554 |
| 2022/0055569 | A1* | 2/2022 | Schmid | B60R 21/2338 |

FOREIGN PATENT DOCUMENTS

| | | |
|---|---|---|
| KR | 10-2017-0002780 A | 1/2017 |
| WO | WO-2022233784 A1 * | 11/2022 |

* cited by examiner

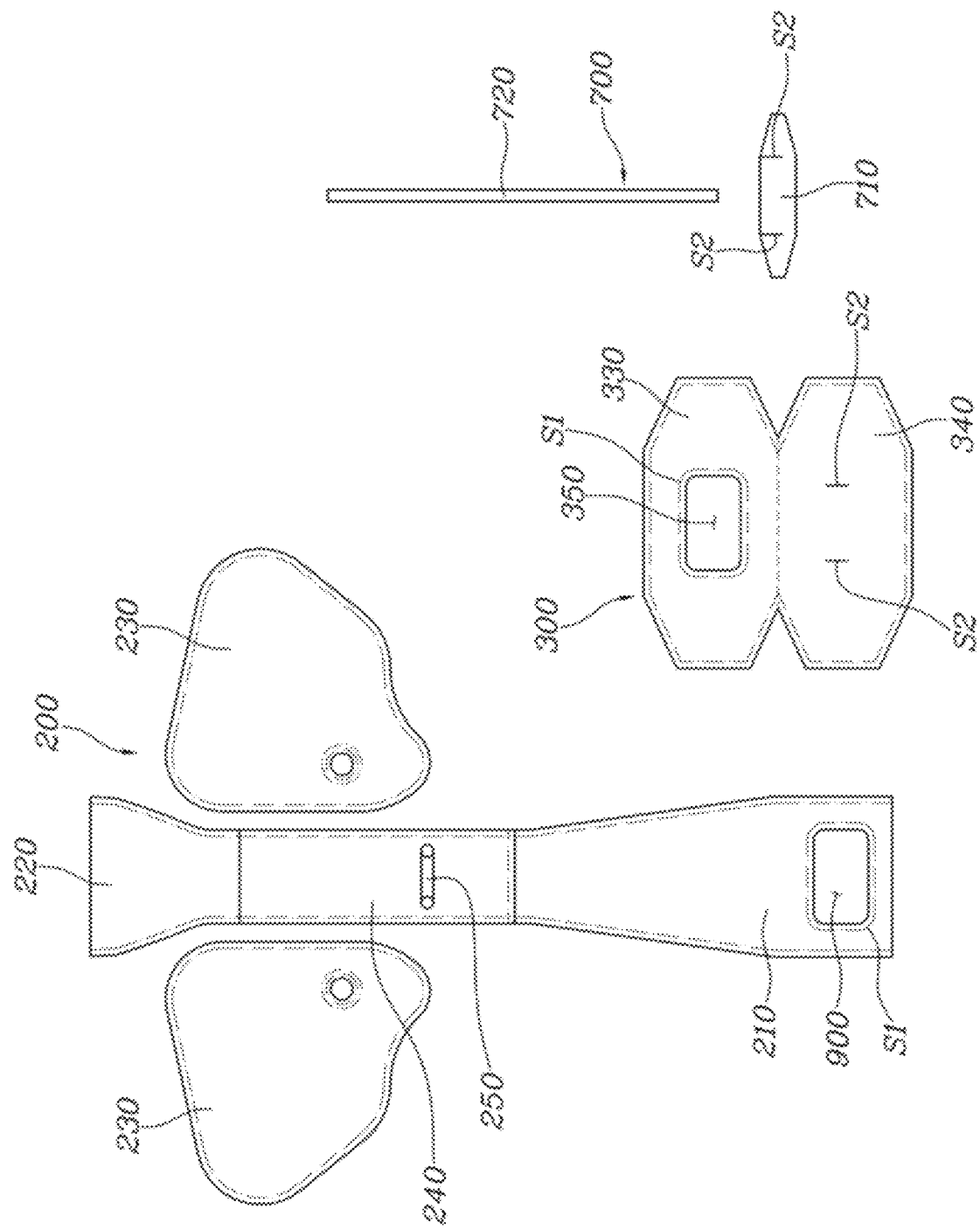

AIRBAG APPARATUS FOR VEHICLE

CROSS-REFERENCE TO RELATED APPLICATIONS

The present application claims priority to Korean Patent Application No. 10-2022-0169055, filed on Dec. 6, 2022, the entire contents of which is incorporated herein for all purposes by this reference.

TECHNICAL FIELD

The present disclosure relates to a vehicle airbag device, and more particularly, to technology for a vehicle airbag device that can effectively protect both a passenger in a normal seating posture and a passenger in a relaxed seating posture in the passenger seat and can also effectively protect the passenger in the passenger seat even in the event of an oblique collision.

BACKGROUND

Autonomous vehicles are smart vehicles that incorporate autonomous driving technology and find ways to the destination without the driver directly manipulating the steering wheel, accelerator pedal, and brake. Recently, the development of autonomous vehicles has been rapidly progressing.

When autonomous driving becomes ubiquitous, drivers may choose a relaxation mode in which drivers rest without directly engaging in driving while the vehicle is driving. In relaxation mode, movements, rotations, and postures of seats may be diversely changed according to the passenger's needs.

In other words, passengers in the front seat can choose a normal seating posture or a relaxed seating posture that allows comfortable rest in an autonomous driving situation.

Normal seating and relaxed seating may be defined based on the inclination of the seatback. Typically, seating may be referred to as normal when the seatback is rotated backward within a range of 20 to 25 degrees with respect to a 90-degree upright position, while backward rotation of the seatback by 40 degrees or more may define relaxed seating.

However, when passengers can switch between normal seating and relaxed seating, a disadvantage arises in that the conventional airbag devices installed in the vehicles have difficulty effectively protecting a passenger-seat passenger in a relaxed seating state in the event of an accident. This may result in aggravated injury to the passenger in a relaxed seating state.

In addition, automakers are developing and selling vehicles that pass the oblique offset collision test to expand the overseas sales network.

The oblique offset collision test is a crash test conducted under the conditions of a vehicle with a speed of 90.1 km/h, an inclination of 15 degrees, an offset amount of 35%, impacting a research moving deformable barrier (RMDB).

In the event of an oblique offset collision, the upper body of the passenger-seat passenger moves farther toward the front of the vehicle while being twisted in the direction of the offset collision (the driver's seat direction). In particular, there is a problem that excessive head rotation causes even greater head injuries when the passenger's head comes into contact with the deployed airbag cushion.

Therefore, to protect a passenger-seat passenger more effectively, particularly in an oblique offset collision, it is necessary to have technology that prevents the passenger's head from rotating using a deployed airbag cushion.

The matters described above as background technology are intended to provide a better understanding of the background of the present disclosure and should not be considered as acknowledging that the present disclosure pertains to the prior art already known to those skilled in the art.

SUMMARY

An object of the present disclosure is to provide a vehicle airbag device including a main cushion and an auxiliary cushion deploying from the main cushion configured to effectively protect both a passenger in a normal seating state and a passenger in a relaxed seating state by differentiating the deployment of the main cushion and the auxiliary cushion according to the passenger-seat passenger's normal seating posture and relaxed seating posture, and in particular, effectively protect the passenger-seat passenger through the auxiliary cushion even in the event of an oblique offset collision, thereby further enhancing passenger protection.

A vehicle airbag device of the present disclosure for achieving the objects described above includes an airbag cushion including a main cushion deploying toward a passenger by receiving airbag gas generated by an inflator and an auxiliary cushion deploying by receiving the airbag gas through the main cushion, a tether release device connected to an airbag housing and activated by an electrical signal, and a tether connecting the auxiliary cushion and the tether release device that is released when the tether release device is operated.

An airbag controller controlling the operation of the inflator and the tether release device is further included, and the airbag controller receives signals from a crash sensor and a seatback inclination sensor to control the operation of the inflator and tether release device.

The airbag housing is fixed to the vehicle body at a position opposite the passenger, and as the inflator and the tether release device are fixed to the airbag housing, the airbag is stowed in a folded state.

The auxiliary cushion is coupled to the rear surface of the main cushions facing the passenger.

A vent hole connected to the auxiliary cushion is formed on the rear surface of the main cushion facing the passenger, and the airbag gas of the main cushion is transferred to the auxiliary cushion through the vent hole.

The tether passes through the vent hole connecting the main cushion and the auxiliary cushion to be coupled to the middle portion of the auxiliary cushion. In the event of a collision while the passenger is in a normal seating state, the airbag cushion deploys without activating the tether release device, and the tether remains unreleased so that the tether release device and the auxiliary cushion remain connected.

When the tether remains unreleased while the airbag cushion deploys, the middle portion of the auxiliary cushion is pressed against the main cushion by the pull of the tether, and the right and left side portions of the auxiliary cushion are filled with the airbag gas and bend toward the middle portion to protrude toward the passenger.

The auxiliary cushion protrudes toward the passenger in a U shape.

As the passenger's head is inserted into the space between the right and left side portions of the auxiliary cushion, the passenger in a normal seating state and the passenger caught in the oblique offset collision can be protected.

The tether passes through the vent hole connecting the main cushion and the auxiliary cushion to be coupled to the middle portion of the auxiliary cushion. When the airbag cushion deploys, the tether is released by the operation of the tether release device in the event of a collision while the passenger is in a relaxed seating state.

When the tether is released, the airbag gas of the main cushion is transferred to the auxiliary cushion through the vent hole so that the entire auxiliary cushion is inflated to the full. The front-to-rear length of the airbag cushion when the tether is released is longer than the front-to-rear length of the airbag cushion when the tether is not released. Thus, the passenger in the relaxed seating state can be protected.

The main cushion includes one center panel and two side panels sewn to the center panel on the right and left sides. A tether hole through which the tether passes is formed on the front surface of the center panel facing the airbag housing. A vent hole that connects the main cushion and the auxiliary cushion and through which the tether and airbag gas pass is formed on a rear surface facing the passenger.

The auxiliary cushion includes a first panel portion and a second panel portion sewn together to form a chamber of a predetermined size inside. A connection hole connected to the vent hole is formed in either the first panel portion or the second panel portion, and the main cushion and the auxiliary cushion are coupled to each other by sewing along the periphery of the connection hole and the vent hole.

The tether is coupled to either the first panel portion or the second panel portion in which a connection hole is not formed.

The tether includes a strap tether coupled to the center of an inner surface of either the first panel portion or the second panel portion in which a connection hole is not formed and a string tether that is coupled to the strap tether at a first end and passes through the connection hole, the vent hole, and the tether hole to be connected to the tether release device at a second end.

The vehicle airbag device according to the present disclosure keeps the tether connected and holds the passenger's movement through the auxiliary cushion in the event of a collision while the passenger-seat passenger is in a normal seating state or in the event of an oblique offset collision, thereby having the effect of effectively protecting the passenger-seat passenger.

In addition, according to the present disclosure, in the event of a collision while a passenger-seat passenger is in a relaxed seating state, the airbag device allows early restraint of the upper body of the passenger-seat passenger in a relaxed seating state by maintaining the sense of volume through disconnecting the tether to fully inflate the auxiliary cushion, and through this, increasing the front-to-rear length of the airbag cushion, thereby having the effect of effectively protecting the passenger-seat passenger in a relaxed seating state.

BRIEF DESCRIPTION OF THE DRAWINGS

FIG. 6 is an exploded view describing a main cushion, an auxiliary cushion, and a tether according to the present disclosure.

DETAILED DESCRIPTION

Figure 1:
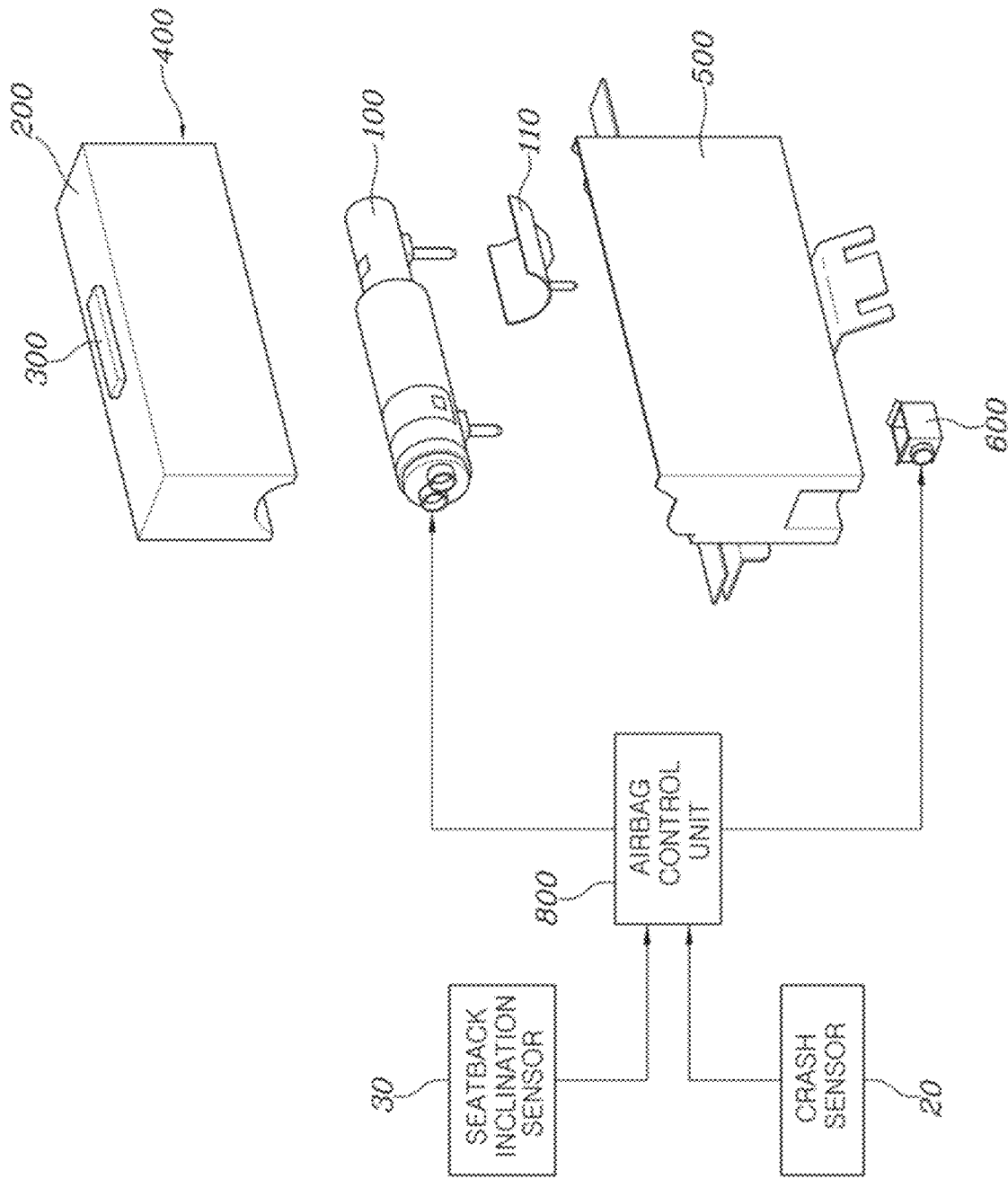
FIG. 1 is a view describing a passenger seat airbag device according to the present disclosure.

The embodiments disclosed herein will be described in detail with reference to the accompanying drawings. However, the same or similar components will be given the same reference numerals regardless of the drawing numbers, and the repetitive descriptions regarding these components will be omitted.

The suffixes "module" and "unit" for the components used in the following description are given or interchangeably used only to facilitate the writing of the specification, without necessarily indicating a distinct meaning or role of their own.

When it is determined that the specific description of the related and already known technology may obscure the essence of the embodiments disclosed herein, the specific description will be omitted.

Further, it is to be understood that the accompanying drawings are only intended to facilitate understanding of the embodiments disclosed herein and are not intended to limit the technical ideas disclosed herein are not limited to the accompanying drawings and include all the modifications, equivalents, or substitutions within the spirit and technical scope of the present disclosure.

The terms including ordinal numbers such as first, second, and the like may be used to describe various components, but the components are not to be limited by the terms. The terms may only be used to distinguish one component from another.

It is to be understood that when a component is referred to as being "connected" or "coupled" to another component, the component may be directly connected or coupled to the other component, or other components may be interposed therebetween.

In contrast, it is to be understood that when a component is referred to as being "directly connected" or "directly coupled" to another component, no other component is interposed therebetween.

Singular expressions include plural expressions unless the context explicitly indicates otherwise.

In the present specification, terms such as "comprise" or "have" are intended to indicate the presence of implemented features, numbers, steps, manipulations, components, parts, or combinations thereof described in the specification and are not to be understood to preclude the presence or additional possibilities of one or more of other features, numbers, steps, manipulations, components, parts or combinations thereof.

In addition, a unit or a control unit, included in the names such as a motor control unit (MCU), a hybrid control unit (HCU), and the like, is a term widely used in the naming of controllers that control specific functions of a vehicle and does not mean a generic function unit.

A controller may include one or more processors to perform functions such as decision-making, calculation, determination, and the like required for controlling a communication device that communicates with other controllers or sensors to control a function it is charged with, a memory for storing an operating system, logic commands, input and output information, and the like, and other functions.

A vehicle airbag device according to a preferred embodiment of the present disclosure will be described below with reference to the accompanying drawings.

According to the present disclosure, the vehicle airbag device is a passenger seat airbag device installed on the instrument panel (dash panel) of a vehicle, which can protect the passenger-seat passenger when activated, and is configured to protect the passenger-seat passenger in both a normal seating state and a relaxed seating state, and, in particular, to protect the passenger-seat passenger in the event of an oblique offset collision.

In other words, as shown in FIGS. 1 to 6, the vehicle airbag device according to the present disclosure includes an airbag cushion 400 that includes an inflator 100 generating airbag gas when activated, a main cushion 200 deploying toward a passenger by receiving the airbag gas generated by the inflator 100 and an auxiliary cushion 300 deploying by receiving the airbag gas through the main cushion 200, a tether release device 600 fixed to an airbag housing 500 and activated by an electrical signal, and a tether connecting the auxiliary cushion 300 and the tether release device 600 and released when the tether release device 600 is activated.

In addition, the vehicle airbag device according to the present disclosure further includes an airbag control unit (ACU) 800 that controls the activation of the inflator 100 and tether release device 600.

The airbag control unit 800 is configured to control the activation of the inflator 100 and the tether release device 600 upon receiving signals from a crash sensor 20 and a seatback inclination sensor 30 installed in the vehicle.

The airbag housing 500 is fixedly installed in the vehicle body (instrument panel, dash panel, cockpit module) at a position opposite a passenger-seat passenger 10, and the airbag cushion 400 is stowed in a folded state in the airbag housing 500 while the inflator 100 and the tether release device 600 are fixed thereto.

The inflator 100 is fixed to the airbag housing 500 through an inflator bracket 110.

The normal seating state and relaxed seating state of the passenger-seat passenger 10 are determined by the seatback inclination of the passenger seat. Typically, seating may be referred to as normal when the seatback is rotated backward within a range of 20 to 25 degrees with respect to a 90-degree upright position, while backward rotation of the seatback by 40 degrees or more may define relaxed seating.

The seatback inclination of the passenger seat is detected by the seatback inclination sensor 30. Signals of the seatback inclination sensor 30 are transmitted to the airbag control unit 800, and the airbag control unit 800 controls the activation of the inflator 100 and tether release device 600 upon receiving the signals of the seatback inclination sensor 30 and the crash sensor 20.

The airbag cushion 400 according to the present disclosure includes the main cushion 200 deployed by the pressure of the airbag gas generated by the inflator 100 and the auxiliary cushion 300 coupled by sewing to a rear surface 210 of the main cushion 200 facing the passenger-seat passenger 10 and deploying upon receiving the airbag gas through the main cushion 200.

A vent hole 900 connected to the auxiliary cushion 300 is formed on the rear surface 210 of the main cushion 200, and the airbag gas of the main cushion 200 is transferred to the auxiliary cushion 300 through the vent hole 900.

The amount of airbag gas transferred from the main cushion 200 to the auxiliary cushion 300 and the time of transfer may be adjusted by the size and number of the vent holes 900.

The tether release device 600 according to the present disclosure is fixed to the airbag housing 500 and activated by an electrical signal of the airbag control unit 800, holds the tether 700 to maintain the shape of the deploying airbag cushion 400 when inactivated, and releases the tether 700 when activated.

In order for the tether release device 600 to be able to release the tether 700, the tether release device 600 may be made of the same explosive device as the inflator or a cutting device that can easily cut the tether.

According to the present disclosure, a first end of the tether 700 is connected to the tether release device 600 fixed to the airbag housing 500, and a second end of the tether 700 passes through the vent hole 900 connecting the main cushion 200 and the auxiliary cushion 300 to be coupled to a middle portion 310 of the auxiliary cushion 300.

Figure 2:
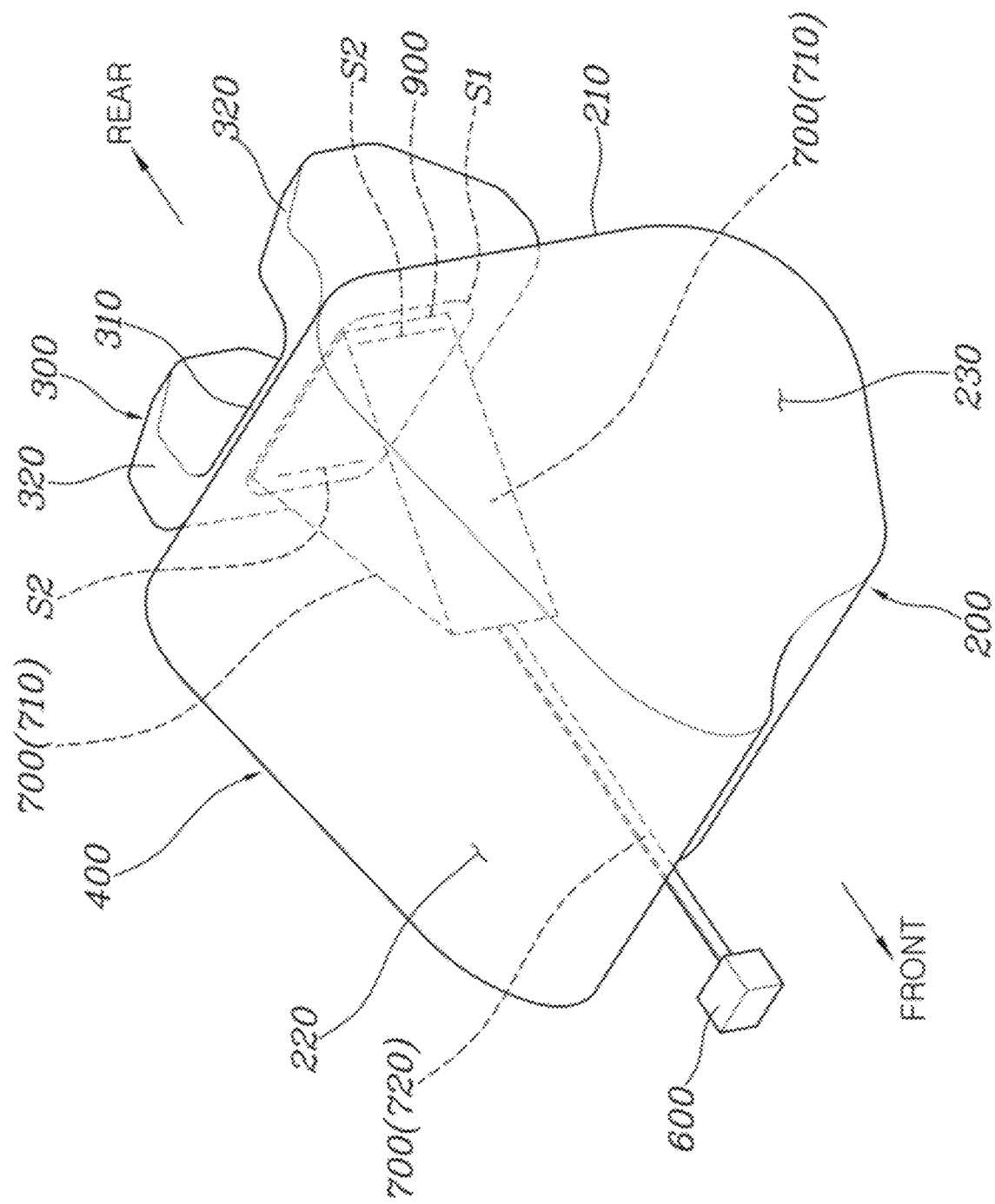
FIG. 2 is a view describing a deployment state of an airbag cushion in the event of a collision while a passenger-seat passenger is in a normal seating state according to the present disclosure.
Figure 3:
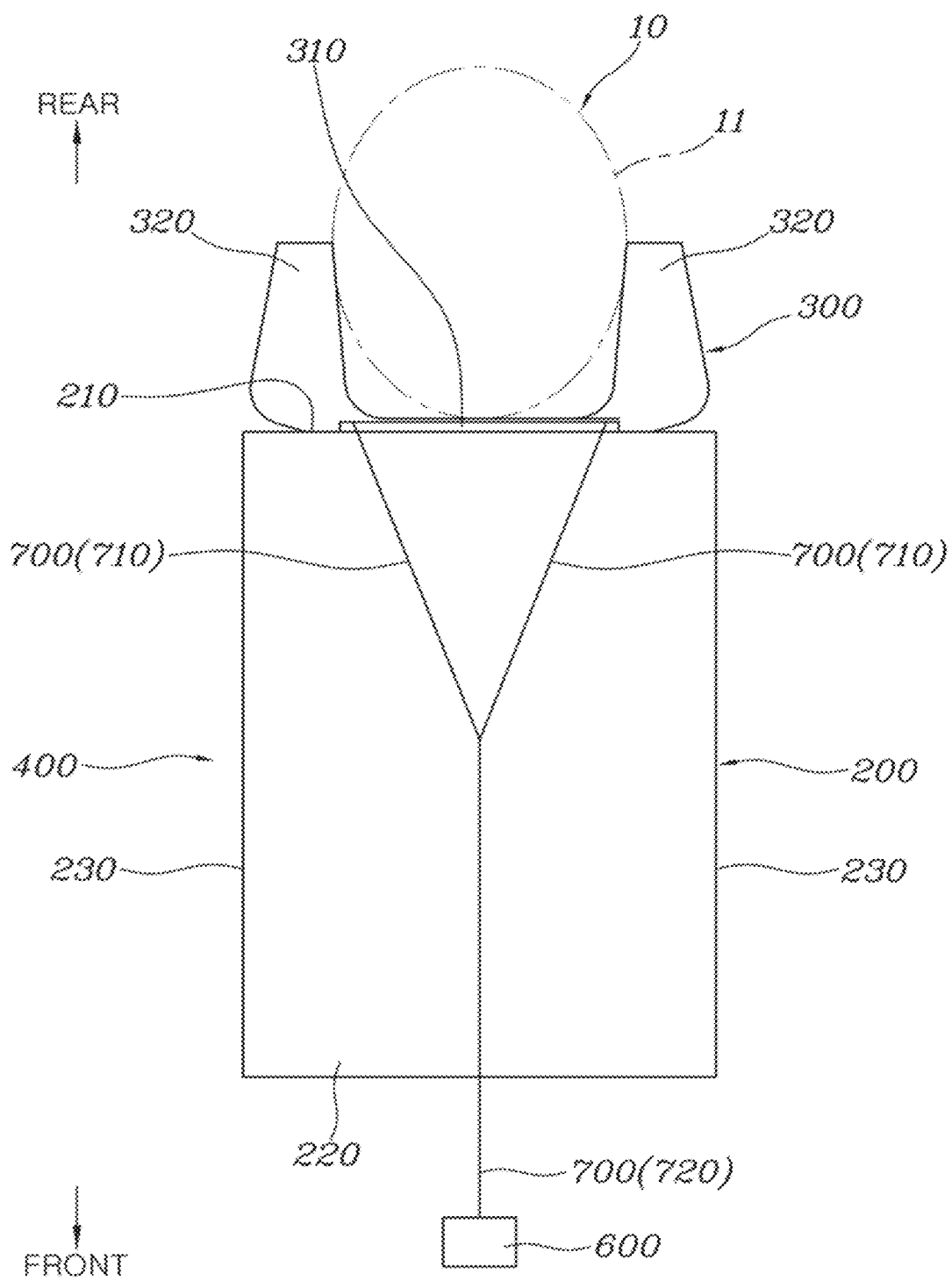
FIG. 3 is a plan view of the deployment state of the airbag in FIG. 2.

FIGS. 2 and 3 are views describing a deployment state of an airbag cushion in the event of a collision while the passenger-seat passenger is in a normal seating state.

As shown in the drawing, in the event of a collision while the passenger-seat passenger is in a normal seating state, the inflator 100 is activated by a control signal of the airbag control unit 800 to generate airbag gas and the main cushion 200 and auxiliary cushion 300 constituting the airbag cushion 400 deploy toward the passenger-seat passenger 10 by the airbag gas.

At this time, the tether release device 600 is not activated and the tether 700 remains unreleased so that the tether release device 600 and the auxiliary cushion 300 remain connected.

When the tether 700 remains unreleased while the airbag cushion 400 deploys, the middle portion 310 of the auxiliary cushion 300 is pressed against the main cushion 200 by the pull of the tether 700, and the right and left side portions 320 of the auxiliary cushion 300 are filled with the airbag gas and bend toward the middle portion 310 to protrude toward a passenger. As a result, the auxiliary cushion 300 protrudes toward the passenger 10 in a U shape.

When the auxiliary cushion 300 protrudes in a U shape, the head 11 of the passenger-seat passenger 10 moves forward to be inserted into a space between the right and left side portions 320 of the auxiliary cushion 300 and supported thereby so that the passenger-seat passenger 10 in a normal seating state may be effectively protected by the auxiliary cushion 300.

In addition, as the head 11 of the passenger-seat passenger 10 is inserted into the space between the right and left side portions 320 of the auxiliary cushion 300 and supported thereby, a rotation movement of the head 11 of the passenger-seat passenger 10 is prevented so that the passenger-seat passenger 10 may be effectively protected even in the event of an oblique offset collision.

Figure 4:
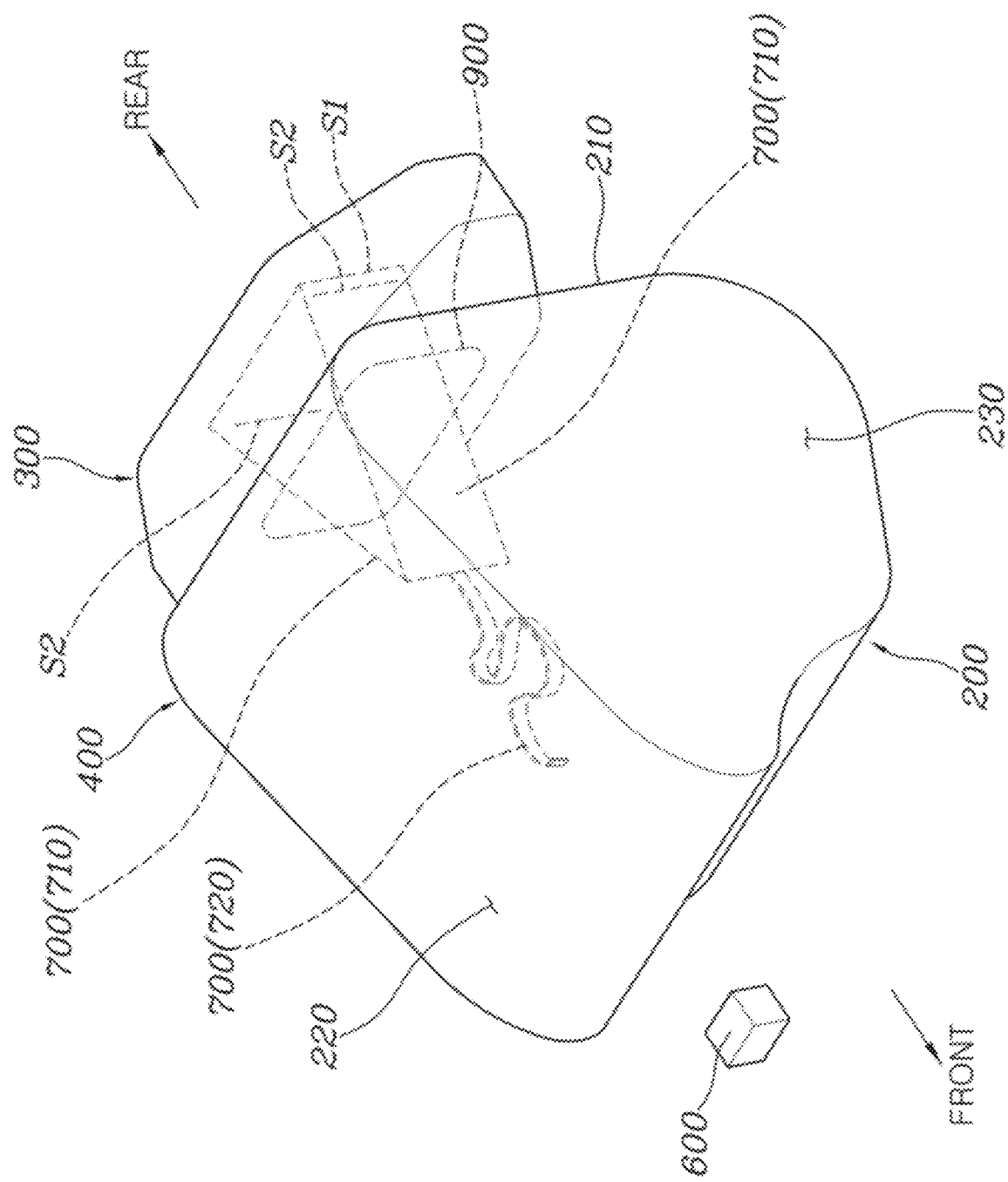
FIG. 4 is a view describing a deployment state of an airbag cushion in the event of a collision while a passenger-seat passenger is in a relaxed seating state according to the present disclosure.
Figure 5:
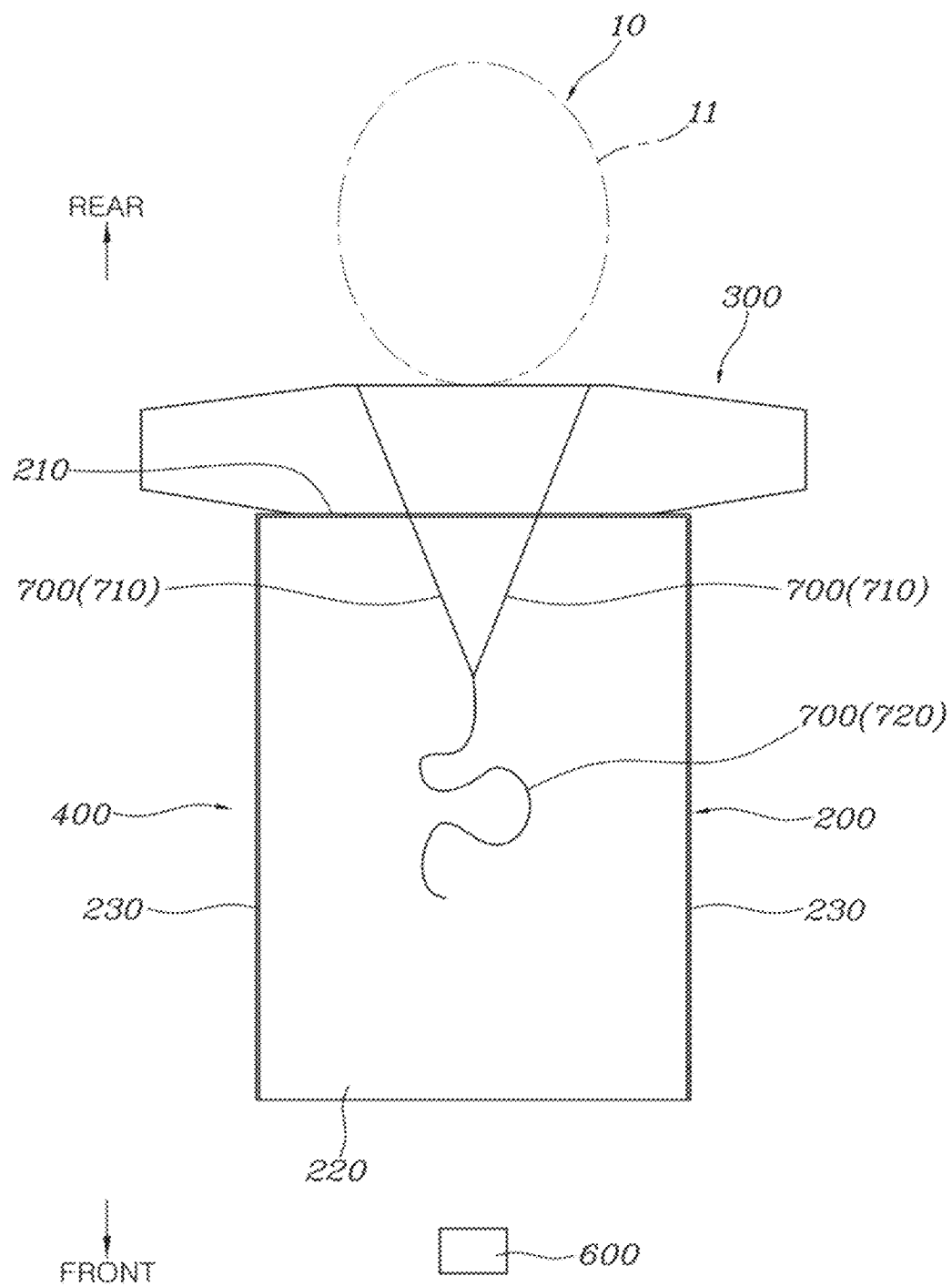
FIG. 5 is a plan view of the deployment state of the airbag in FIG. 4.

FIGS. 4 and 5 are views for describing a deployment state of an airbag cushion in the event of a collision while a passenger-seat passenger is in a relaxed seating state.

As shown in the drawing, in the event of a collision while the passenger-seat passenger 10 is in a relaxed seating state, the inflator 100 is activated by a control signal of the airbag control unit 800 to generate airbag gas and the main cushion 200 and the auxiliary cushion 300 constituting the airbag cushion 400 deploy toward the passenger-seat passenger 10 by the airbag gas.

At this time, the tether release device 600 is activated by a signal of the airbag control unit 800 to release the tether 700. When the tether is released, the airbag gas of the main cushion 200 is transferred to the auxiliary cushion 300 through the vent hole 900 to inflate the entire auxiliary cushion 300 to the full.

When the tether 700 is released and the main cushion 200 and the auxiliary cushion 300 are inflated to the full, the side portions 320 of the auxiliary cushion 300 unfold right and left of the middle portion 310 into a straight-line shape, and the volume of the auxiliary cushion 300 increases in the front-to-rear direction to maintain a sense of volume.

Therefore, the front-to-rear length of the airbag cushion 400 from the middle portion 310 of the auxiliary cushion 300 when the tether 700 is released is longer than the front-to-rear length of the airbag cushion 400 when the tether is not released. As a result, the upper body of the passenger-seat passenger 10 in a relaxed seating state may be restrained early so that the passenger-seat passenger in a relaxed seating state may be protected more effectively.

FIG. 6 is an exploded view of the main cushion 200, the auxiliary cushion 300, and the tether 700 according to the present disclosure.

As shown in the drawing, the main cushion 200 according to the present disclosure includes one center panel 220 and two side panels 230 coupled by sewing to the center panel 220 on the right and left sides of the center panel 220.

A tether hole 250 through which the tether 700 passes is formed on a front surface 240 of the center panel 220 facing the airbag housing 500, and a vent hole 900 that connects the main cushion 200 and the auxiliary cushion 300 and through which the tether 700 and the airbag gas pass is formed on a rear surface 210 facing the passenger-seat passenger 10.

The auxiliary cushion 300 includes a first panel portion 330 and a second panel portion 340 coupled to each other by sewing to form a chamber of a predetermined size therein.

The first panel portion 330 and the second panel portion 340 overlap each other and are coupled to each other by sewing along the outer edges so that a chamber of a predetermined size is formed inside after sewing.

A connection hole 350 connected to the vent hole 900 is formed in either the first panel portion 330 or the second panel portion 340, and the present disclosure describes the connection hole 350 formed in the first panel portion 330 as an embodiment.

The main cushion 200 and the auxiliary cushion 300 are coupled to each other by sewing, and to this end, are sewn together along the edges of the vent hole 900 of the main cushion 200 and the connection hole 350 of the auxiliary cushion 300.

Reference numeral S1 refers to a sewing line for coupling the main cushion 200 and the auxiliary cushion 300.

The tether is coupled in either the first panel portion 330 or the second panel portion 340 in which the connection hole 350 is not formed.

In other words, one end of the tether 700 is coupled by sewing to the center of the inner surface of the second panel portion 340.

The tether according to the present disclosure includes a strap tether 710 coupled to the center of the inner surface of the second panel portion 340 and a string tether 720 that is coupled to the strap tether 710 at one end and passes through the connection hole 350, a vent hole 900, and the tether hole 250 to be connected to the tether release device 600 at the other end.

Reference numeral S2 refers to a sewing line for coupling the strap tether 710 and the second panel portion 340 of the auxiliary cushion 300.

As described above, the vehicle airbag device according to the present disclosure keeps the tether 700 connected and holds the passenger's movement through the auxiliary cushion 300 in the event of a collision while the passenger-seat passenger 10 is in a normal seating state or in the event of an oblique offset collision, thereby having the advantage of effectively protecting the passenger-seat passenger.

In addition, according to the present disclosure, in the event of a collision while a passenger-seat passenger is in a relaxed seating state, the airbag device allows early restraint of the upper body of the passenger-seat passenger 10 in a relaxed seating state by maintaining the sense of volume by disconnecting the tether to inflate the auxiliary cushion 300 to the full, and through this, increasing the front-to-rear length of the airbag cushion 200, thereby having the advantage of effectively protecting the passenger-seat passenger in a relaxed seating state.

While only specific embodiments of the present disclosure have been described herein, it will be apparent to those skilled in the art that the present disclosure may be variously improved upon and modified within the scope not departing from the technical spirit of the present disclosure provided by the following claims.

What is claimed is:

1. A vehicle airbag device comprising:
   an airbag cushion including a main cushion deployed toward a passenger by receiving airbag gas generated by an inflator;
   an auxiliary cushion deployed by receiving airbag gas through the main cushion;
   a tether release device fixed to an airbag housing and activated by an electrical signal; and
   a tether interconnecting the auxiliary cushion and the tether release device, the tether being released when the tether release device is activated;
   wherein, when the tether remains unreleased while the airbag cushion deploys, a middle portion of the auxiliary cushion is pressed against the main cushion by pull of the tether, and right and left side portions of the auxiliary cushion are filled with the airbag gas to protrude toward the passenger.

2. The vehicle airbag device of claim 1, wherein the auxiliary cushion protrudes toward the passenger in a U shape.

3. The vehicle airbag device of claim 1, wherein the passenger in a normal seating state and the passenger caught in an oblique offset collision may be protected as the head of the passenger inserts into a space between the right and left side portions of the auxiliary cushion.

4. The vehicle airbag device of claim 1, further comprising a seatback inclination sensor to detect a seatback inclination of a passenger seat, wherein the tether release device is activated by an electrical signal from the seatback inclination sensor when the seatback inclination of the passenger seat exceeds a threshold angle with respect to a 90-degree upright position.

5. The vehicle airbag device of claim 4, wherein the threshold angle is 40 degrees.

6. A vehicle airbag device comprising:
   an airbag cushion including a main cushion deployed toward a passenger by receiving airbag gas generated by an inflator, wherein the main cushion includes one center panel and two side panels sewed to the center panel on right and left sides of the center panel;
   an auxiliary cushion deployed by receiving airbag gas through the main cushion, the auxiliary cushion comprising a first panel portion and a second panel portion sewed together to form a chamber of a predetermined size therein;
   a tether release device fixed to an airbag housing and activated by an electrical signal;
   a tether interconnecting the auxiliary cushion and the tether release device, the tether being released when the tether release device is activated;

a tether hole through which the tether passes that is formed on a front surface of the center panel facing an airbag housing;

a vent hole interconnecting the main cushion and the auxiliary cushion, and through which the airbag gas passes, that is formed on a rear surface facing the passenger; and a connection hole connected to the vent hole that is formed in either the first panel portion or the second panel portion, wherein the main cushion and the auxiliary cushion are sewed together along edges of the connection hole and the vent hole;

wherein the tether includes a strap tether coupled to a center of an inner surface of either the first panel portion or the second panel portion in which the connection hole is not formed, and a string tether having a first end coupled to the strap tether and passing through the connection hole, the vent hole, and the tether hole, a second end of the string tether connected to the tether release device.

7. The vehicle airbag device of claim 6, further comprising a seatback inclination sensor to detect a seatback inclination of a passenger seat, wherein the tether release device is activated by an electrical signal from the seatback inclination sensor when the seatback inclination of the passenger seat exceeds a threshold angle with respect to a 90-degree upright position.

8. The vehicle airbag device of claim 7, wherein the threshold angle is 40 degrees.

\* \* \* \* \*